United States Patent
Price Jones et al.

(10) Patent No.: US 10,532,897 B2
(45) Date of Patent: Jan. 14, 2020

(54) HYDRAULIC HOISTING SYSTEM AND METHOD

(71) Applicant: Cementation Canada Inc., North Bay, Ontario (CA)

(72) Inventors: Alun Price Jones, North Bay (CA); Stephen Korski, North Bay (CA); Roy Stephen Slack, North Bay (CA)

(73) Assignee: Cementation Canada Inc., Ontario (CA)

( * ) Notice: Subject to any disclaimer, the term of this patent is extended or adjusted under 35 U.S.C. 154(b) by 0 days.

(21) Appl. No.: 15/325,029

(22) PCT Filed: Jul. 10, 2015

(86) PCT No.: PCT/CA2015/050643
§ 371 (c)(1),
(2) Date: Jan. 9, 2017

(87) PCT Pub. No.: WO2016/004535
PCT Pub. Date: Jan. 14, 2016

(65) Prior Publication Data
US 2017/0210573 A1    Jul. 27, 2017

(30) Foreign Application Priority Data
Jul. 10, 2014   (CA) ...................................... 2856435

(51) Int. Cl.
*B65G 53/30* (2006.01)
*B65G 53/42* (2006.01)
*E21F 13/04* (2006.01)

(52) U.S. Cl.
CPC ............. *B65G 53/30* (2013.01); *B65G 53/42* (2013.01); *E21F 13/042* (2013.01)

(58) Field of Classification Search
CPC ............................... B65G 53/30; B65G 53/42
(Continued)

(56) References Cited

U.S. PATENT DOCUMENTS 616,537  A  * 12/1898  Honigmann ........... B65G 53/30
                                                406/106
2,610,901  A  *  9/1952  Cross, Jr. ............... B65G 53/30
                                                406/49
(Continued)

FOREIGN PATENT DOCUMENTS

DE         2924934 A1   1/1981
WO    WO 2016/004535 A1   1/2016

OTHER PUBLICATIONS

International Search Report from International Application No. PCT/CA2015/050643 dated Sep. 29, 2015, application now published as International Publication No. WO 2016/004535 published on Jan. 14, 2016.

(Continued)

*Primary Examiner* — William R Harp
(74) *Attorney, Agent, or Firm* — McDermott Will & Emery LLP; Judy M. Mohr; Wen Li

(57) ABSTRACT

Disclosed is a hydraulic hoisting system for moving material from an underground position to a surface level. In most cases, the system will be used to move fragmented rock or ore generated during the normal operation of a mine to a position on or near the surface of the Earth so that the rock or ore can be further processed. The system is a conduit loop for continuous flow of circulating fluid from near or at the surface to underground; a slurry preparation unit for mixing the material with a portion of the fluid to form a slurry; and an injection unit for injecting the slurry into the conduit.

19 Claims, 2 Drawing Sheets

(58) Field of Classification Search
USPC .......................................................... 406/106
See application file for complete search history.

(56) References Cited

U.S. PATENT DOCUMENTS

| | | | | |
|---|---|---|---|---|
| 2,793,082 A * | 5/1957 | Gardner, Jr. | ........... | E21F 13/042 406/128 |
| 2,796,032 A * | 6/1957 | Ballert | ................... | F01L 25/063 417/317 |
| 2,938,751 A * | 5/1960 | Nogami | ................ | E21F 13/042 406/126 |
| 3,232,672 A * | 2/1966 | Gardner, Jr. | ........... | B65G 53/30 406/125 |
| 3,244,455 A * | 4/1966 | Condolios | .............. | B65G 53/30 406/126 |
| 3,260,548 A * | 7/1966 | Reichl | .................... | B65G 53/30 299/18 |
| 3,269,777 A | 8/1966 | MacLellan | | |
| 3,371,965 A * | 3/1968 | MacLellan | ............ | E21F 13/042 406/125 |
| 3,485,534 A * | 12/1969 | Wanzenberg | .......... | B65G 53/30 209/158 |
| 3,790,214 A * | 2/1974 | Kilroy | .................... | E21C 25/60 299/17 |
| 4,114,954 A * | 9/1978 | Pasieka | .................. | B65G 53/30 299/18 |
| 4,143,922 A * | 3/1979 | Sweeney | ................ | B65G 53/30 299/18 |
| 4,154,484 A * | 5/1979 | Holzenberger | ........ | B65G 53/30 406/106 |
| 4,466,759 A * | 8/1984 | Sweeney | ................ | B65G 53/30 137/115.25 |
| 4,527,836 A | 7/1985 | Uhri | | |
| 4,666,347 A * | 5/1987 | Janssen | .................. | B65G 53/30 137/888 |
| 4,702,421 A * | 10/1987 | Wruck | ................... | B65G 53/30 241/15 |
| 4,915,452 A | 4/1990 | Dibble | | |
| 5,199,767 A * | 4/1993 | Jimbo | ...................... | E02F 7/10 299/8 |
| 5,435,628 A | 7/1995 | Montgomery et al. | | |
| 2002/0011338 A1 | 1/2002 | Maurer et al. | | |
| 2011/0311321 A1 * | 12/2011 | Trueman | ................ | E21F 13/042 406/146 |

OTHER PUBLICATIONS

Supplementary European Search Report from European Patent Application No. EP15819732, 2 pages, dated Jan. 17, 2018.

* cited by examiner

HYDRAULIC HOISTING SYSTEM AND METHOD

CROSS-REFERENCE TO RELATED APPLICATIONS

This application is a U.S. National Stage of International Patent Application No. PCT/CA2015/050643, filed Jul. 10, 2015, which claims the benefit of priority to CA Patent Application No. 2,856,435 filed Jul. 10, 2014, each of which is hereby incorporated by reference in its entirety.

FIELD OF THE INVENTION

The invention generally relates to a system and method for hydraulically hoisting material from an underground position. More specifically, the invention relates to a system that has a continuous flow of circulating fluid from the surface to the underground, in which a slurry of material from the underground is introduced to the fluid and removed at the surface.

BACKGROUND OF THE INVENTION

During normal operation of a mine, material is constantly being generated that needs to be removed from the mine workings. For example, in drill-and-blast mining, the fragmented rock or muck that is generated after the blast needs to be removed in order for advancement of the tunnel to occur. In continuous drilling and mechanical rock cutting methods, significant amounts of fragmented rock have to be removed. Furthermore, raiseboring activities that generate new vertical shafts to the mines generate fragmented rock that needs to be removed.

In most cases, the material generated from such activities has been removed from mine workings by being vertically hoisted in a shaft with a suitable conveyance. For example, mine-shaft elevators are typically loaded with the fragmented rock and hoisted to the surface for further processing. At mine locations where there is ramp access, fragmented rock can be removed with a conveyor belt or with a fleet of trucks.

Hydraulic hoisting systems have also been considered for removing material from an underground mine. Essentially there are two categories of hydraulic hoisting systems, pumping systems and feeder systems (see van den Berg G and Cooke R, "Hydraulic Hoisting Technology for Platinum Mines", presented at the Platinum Adding Value Conference 2004).

Pumping systems involve using a pump or multiple pumps to energize a slurry containing the fragmented rock or ore to travel through a mostly vertical conduit to be deposited at the surface. In these applications, the pump responsible for moving the slurry resides in the mine and is connected to the slurry preparation unit. Moreover, the slurry is in direct contact with the pump.

In feeder systems, on the other hand, the slurry is isolated from the pumping equipment by some form of feeder or pressure exchange system. In such systems, a low pressure pump is typically required to supply the feeder.

SUMMARY OF THE INVENTION

According to an aspect of the present invention, there is provided a hydraulic hoisting system for hoisting material from underground. The system includes: a conduit loop for continuous flow of circulating fluid from near or at the surface to underground comprising a downcomer conduit and a riser conduit; a slurry preparation unit for mixing the material with a portion of the fluid to form a slurry; and an injection unit for injecting the slurry into the conduit.

In one embodiment, the system further comprises a pump in the conduit loop to energize the circulating fluid prior to entering the downcomer conduit.

In another embodiment the system further comprises a pump in the conduit loop located in the riser conduit to energize the circulating fluid and slurry on the emergent side of the system. In other words, the pump is positioned to energize the circulating fluid and slurry traveling from an underground position to a surface position.

In a second embodiment, the system further comprises a separator in the conduit loop at outlet of the riser conduit for separating the material from the circulating fluid.

In a further embodiment, the system further comprises a concrete pump at the outlet of the slurry preparation unit for energizing the slurry prior to entering the injection unit.

In a still further embodiment, the system further comprises a pre-screening area for sorting the material based on size and shape prior to entering the slurry preparation unit.

In a yet further embodiment, the system further comprises free fall prevention valves or check valves along the riser conduit.

In another embodiment, the conduit loop comprises a segment substantially perpendicular to the downcomer and riser conduits.

In yet another embodiment, the conduit loop comprises two nested concentric conduits of differing diameters which together comprise both the downcomer and riser conduits.

In an embodiment, the injection unit is positioned at the intersection of the segment and the riser conduit.

In another embodiment, the injection unit is positioned at the lowermost end of the nested concentric conduits arrangement.

In a further embodiment, the material is fragmented rock or ore.

In a yet further embodiment, the fluid is water or a water-based fluid such as a fluid mud comprising a mixture of water and bentonite clay. The fluid can further comprise an additive.

According to another aspect of the present invention, there is provided a method for hoisting material from underground. The method comprising the steps of: providing a looped continuous flow of circulating fluid from near or at the surface to underground; preparing a slurry comprising material and liquid at an underground location; injecting the slurry into the looped continuous flow of circulating fluid for transport to at or near the surface; and separating the slurry into a material component and a fluid component at or near the surface.

In one embodiment, the slurry is separated based on weight, size and/or density of the materials.

In another embodiment, the fluid is water or a water-based fluid. The fluid can further comprise an additive.

BRIEF DESCRIPTION OF THE DRAWINGS

These and other features, aspects and advantages of the present invention will become better understood with regard to the following description and accompanying drawings wherein:

FIG. 2 is a representation of the hydraulic hoisting system where the downcomer and riser conduits are provided as two nested concentric conduits.

DETAILED DESCRIPTION

The following description is of an illustrative embodiment by way of example only and without limitation to the combination of features necessary for carrying the invention into effect.

A hydraulic hoisting system is provided for moving material from an underground position to a surface level. In most cases, the system will be used to move fragmented rock or ore generated during the normal operation of a mine to a position on or near the surface of the Earth so that the rock or ore can be further processed.

During normal operation of a mine, material is generated during blasting or drilling or mechanical rock cutting for advancement of the tunnel or opening or shaft. Alternatively, raiseboring activities to generate vertical shafts from the surface to a mine tunnel creates material that must be removed from the mine. In many of these cases, the material, usually in the form of fragmented rock or ore, needs to be removed from the mine opening.

Figure 1:
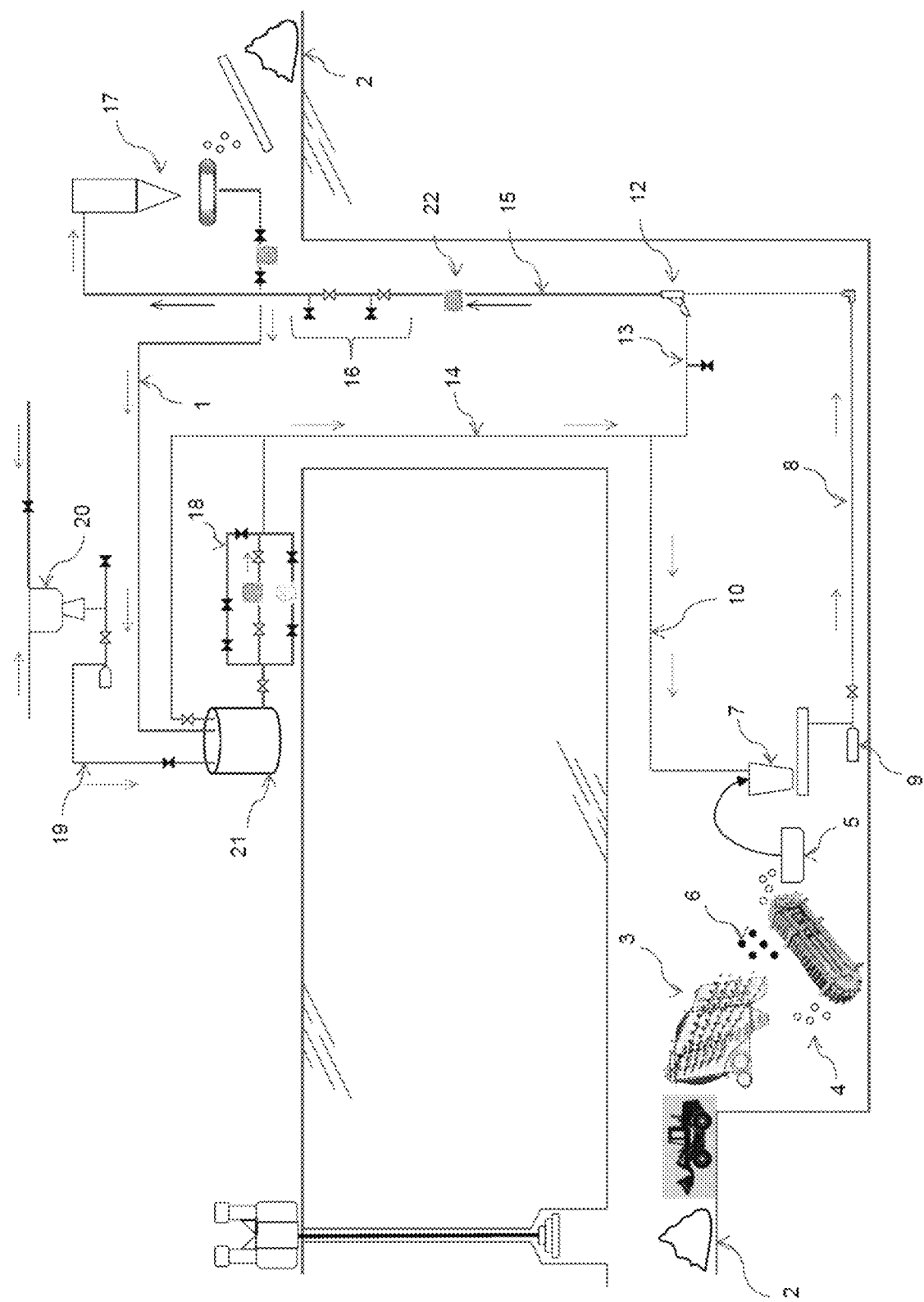
FIG. 1 is a representation of the hydraulic hoisting system according to an embodiment of the present invention.

With reference to FIG. 1, the material (2) is transported from the tunnel, heading mine workings or vertical shaft of the mine to a pre-screening facility (3) located in the mine that sorts the material based primarily on size of the fragments. Material (2) that is less than about two to three inches in dimension (4) can be transferred to a weigh scale (5) for use in the slurry preparation step. Storage bins (not shown) may be provided to store the suitable material for use at a later time. Larger material (6), i.e. rock or ore material having a general dimension greater than two to three inches, is transported to a crusher (not shown) for further processing. Eventually the larger rock or ore material (6) is ground into a fragment size that allows it then to be transferred to the weigh scale (5) for use in the slurry preparation step.

A predetermined volume of suitably sized material (4) is mixed with circulating fluid or with a fluid or suitable liquid that may be stored or available at the slurry preparation site. The suitably sized material (4) is mixed with circulating fluid in a mixing tank or hopper (7) to create a slurry. Mixing tanks suitable for generating a slurry include, but are not limited to a concrete mixer. The slurry exits the mixing tank (7) into the inlet of the concrete pump (9) positioned at the outlet of the mixing tank (7) to propel the slurry along the feeder conduit (8).

The slurry is introduced into the fluid flow within the conduit loop through an injection unit (12). The injection unit (12) can be placed anywhere along the transitional segment (13) of the conduit loop. Preferably, the injection unit (12) is positioned at the transition point where the fluid is no longer traveling downwards or horizontal, but is traveling upwards, against gravity, to the surface. For example, the injection unit (12) can be positioned at the intersection of the transitional segment (13) and the riser conduit (15). Moreover, the delivery pressure rating of the concrete pump (9) and the injection unit (12) should exceed the hydrostatic pressure of the looped conduit at the position of the injection unit (12).

As a further embodiment of the system, the facility to inject compressed air (not shown) into the conduit loop at a position close to the base of the riser conduit may be incorporated such as to facilitate a reduction in the density of the circulating fluid and slurry mixture to encourage the flow up the riser conduit. Moreover, one or more pumps (22) can be provided in the riser conduit (15) to energize the circulating fluid and slurry traveling from an underground position to a surface position.

Since the slurry contains fragmented rock, the slurry should be introduced into the conduit loop at a position where the number of bends or elbows in the conduit that the slurry must travel through is minimized. This will potentially prolong the life of the conduit.

The injection unit (12) may incorporate the form of any one or any multiple of the following types of unit including, but not limited to: venturi style nozzle; ejector nozzles; static mixer; manifold; perforated tubes; or compressed air injector.

Alternatively a low pressure valved manifold system, described in Van der Berg (supra), the contents of which are incorporated herein by reference, can be used to introduce the slurry into the fluid flow within the conduit loop.

In order to prevent damage to the injection unit (12) or to limit the potential for difficulties due to blockages from occurring in the event of a pressure loss in the conduit loop, one or more free fall prevention valves (16) can be positioned along the riser conduit (15). In normal operation, these valves (16) will be open to allow for unobstructed movement of the fluid through the riser conduit (15). However, in the event of a pressure drop in the system, the valves (16) will close to stop the slurry from falling and potentially settling, thus causing blockage or damage to the injection unit (12).

The circulating fluid containing the slurry travels up the riser conduit (15) to a position that is at or near the surface. Once out of the underground mine, the material (2) introduced into the conduit loop at the injection unit (12) is sorted from the slurry and circulating fluid at separator (17). A number of different methods and separators (17) can be used to remove the material (2) from the circulating fluid. For example, but not limited to, primary screening, primary shakers designed to remove coarse particles, hydrocyclone feed pumps, desanding hydrocyclones over dewatering screens, or desilting hydrocyclones over fine mesh dewatering screens, and discharge pumps. Variables for primary screening include screening area, screen aperture, single or double deck, angle of decline and screen material. Screen types include slotted polyurethane, stainless steel wedgewire or woven wire. Multiple units can be interlinked to provide the required flows and solids handling capacity. Various sizes of hydrocyclone are used ranging from 5" to 26", and the hydrocyclone underflow is dewatered by long life, wear resistant slotted screens of polyurethane or stainless steel. Further, settling tanks, or mud cleaners can be used on their own or alternatively used with desilters placed downstream for further fine cleaning of the circulating fluid.

The fluid exiting the separator (17) continues along the conduit loop (1) towards pump (18). The fluid exiting the separator is primarily clean, meaning that it is mostly free from solid material. The solid material (2) is removed from the separator (17) for further processing or disposal.

The clean fluid from the separator (17) travels along the conduit (1) to an inlet to the pump (18). Alternatively, the clean fluid may be stored in a storage tank (21) prior to entering the pump (18). Additional fluid can be added to the storage tank (21) through an auxiliary inlet (19).

In order to optimize the performance of the system, additives can be added to the circulating fluid to modify such properties of the fluid as the viscosity, density and rheological behaviour of the fluid. For example, drilling mud such as bentonite, or natural or synthetic mixtures can be used as additives to modify the physical properties of the circulating fluid. These additives can be stored in one or more additive storage containers (20) and added to the storage tank (21) prior to the circulating fluid entering the pump (18) and the downcomer conduit (14). Mixing blades can be included in the storage tank (21) to mix the additives with the fluid. In most cases, the fluid used in this system will be water or some form of water-based fluid, such as fluid mud comprising a mixture of water and bentonite clay.

The circulating fluid enters the downcomer conduit (14) through pump (18). The velocity, pressure and volume at which the circulating fluid enters is controlled by the pump (18) and will be dependent on the depth of the mine and the overall length of the conduit loop and the elevation of the separator (17). The pump (18) can be a single pump or a plurality of pumps. It is preferred that the pump (18) is a variable speed pump in order to control the flow of the fluid at an optimal desired level. In some cases, it may be advantageous to include a bypass (recirculation) valve from the pump (18) outlets back to the storage tanks.

In implementing a system as described above, the pressure rating of the actual pipework used in the conduit loop should be carefully considered, since the pressure of the circulating fluid could be significant due to the hydrostatic head and to allow the fluid to flow through the system.

Figure 2A:
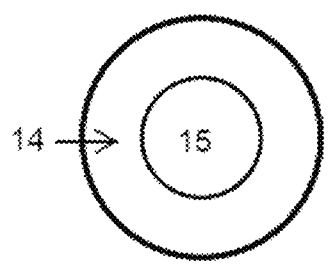
FIG. 2A shows the two nested concentric conduits in cross-section.
Figure 2B:
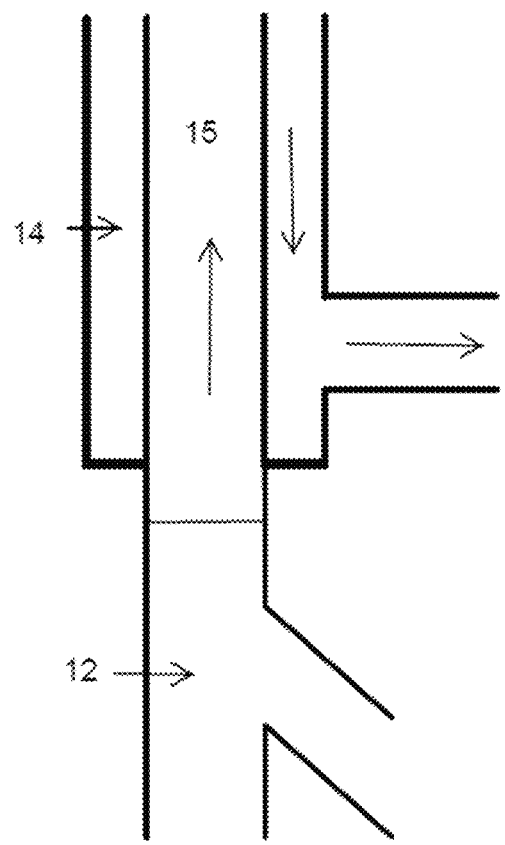
FIG. 2B shows the two nested concentric conduits in conjunction with the injection unit.

In another embodiment, the downcomer conduit (14) and the riser conduit (15) are provided as two nested concentric conduits of differing diameters (FIG. 2). In this arrangement, the slurry injection unit (12) is positioned at or near the lowermost end of the nested concentric conduits The process and system described herein allows for the removal of rock or ore in a continuous process through a system that will run as long as needed and that can be stopped at will until needed again, which can increase productivity, efficiency and provide cost savings. Moreover, this system provided herein is potentially safer than traditional methods, since personnel are not required to work under suspended buckets or conveyances.

The overall space occupied by the vertical elements of the apparatus is less in cross sectional area than required for conventional hoisting conveyances; this offers the potential for smaller diameter vertical shafts that can still provide comparable hoisting tonnage performance, and hence better economy. In some embodiments, the system could operate with the vertical elements accommodated within smaller diameter drilled boreholes obviating the need for conventional larger sized mineshafts to house a rock removal system, and the prospect of application in areas where conventional large diameter shafts are not suitable due to geological conditions, for example.

It should be understood that regulators, valves, sensors, switches and the like can be positioned at various locations along the system to control the pressure, volume, direction of flow, and velocity of the fluid and slurry moving throughout the system. For example, a density detection sensor can be positioned near the injection unit (12) to monitor the injection of slurry into the conduit loop. The speed of the concrete pump (9) feeding into the injection unit (12) can be regulated to ensure that the density and volume of material in the conduit loop does not exceed a desired value. These components can be manual or controlled by a microprocessor and related circuitry.

The present invention has been described with regard to the preferred embodiments. However, the scope of the claims should not be limited to the illustrative embodiments, but should be given the broadest interpretation consistent with the description as a whole.

The invention claimed is:

1. A hydraulic hoisting system for hoisting material from underground, the system comprising:
a conduit loop for continuous flow of circulating fluid from near or at the surface to underground comprising a downcomer conduit, a transitional segment, and a riser conduit;
a pump positioned in the conduit loop to energize the circulating fluid prior to entering the downcomer conduit,
a slurry preparation unit for mixing the material with a portion of the fluid to form a slurry; and
an injection unit positioned at the intersection of the transitional segment and the riser conduit or in the riser conduit of the conduit loop near the intersection of the transitional segment and the riser conduit for injecting the slurry into the conduit loop at a delivery pressure rating that exceeds the hydrostatic pressure of the circulating fluid in the conduit loop at the position of the injection unit.

2. The system of claim 1, further comprising a pump in the conduit loop located in the riser conduit to energize the circulating fluid and slurry traveling from an underground position to a surface position.

3. The system of claim 1, further comprising a separator in the conduit loop at the outlet of the riser conduit for separating the material from the circulating fluid.

4. The system of claim 1, further comprising a concrete pump at the outlet of the slurry preparation unit for energizing the slurry prior to entering the injection unit.

5. The system of claim 1, further comprising a pre-screening area for sorting the material based on size and shape prior to entering the slurry preparation unit.

6. The system of claim 1, further comprising free fall prevention valves along the riser conduit.

7. The system of claim 1, wherein the downcomer and riser conduits are provided as two nested concentric conduits of differing diameters.

8. The system of claim 7, wherein the injection unit is positioned at or near the lowermost end of the nested concentric conduits arrangement.

9. The system of claim 1, wherein the conduit loop comprises a segment substantially perpendicular to the downcomer and riser conduits.

10. The system of claim 9, wherein the injection unit is positioned at the intersection of the transitional segment and the riser conduit.

11. The system of claim 1, wherein the material is fragmented rock or ore.

12. The system of claim 1, wherein the fluid is water or a water-based fluid.

13. The system of claim 12, wherein the water-based fluid is a fluid mud comprising a mixture of water and bentonite clay.

14. The system of claim 12, wherein the fluid further comprises an additive.

15. A method for hoisting material from underground comprising the steps of:
providing a looped continuous flow of circulating fluid from near or at the surface to underground through a conduit loop comprising a downcomer conduit, a transitional segment, and a riser conduit;
passing the fluid through a pump prior to entering the downcomer conduit;
preparing a slurry comprising material and fluid at an underground location;

injecting the slurry at a delivery pressure rating that exceeds the hydrostatic pressure of the circulating fluid in the conduit loop at the position of an injection unit into the looped continuous flow of circulating fluid for transport to at or near the surface; and separating the slurry into a material component and a fluid component at or near the surface.

16. The method of claim 15, wherein slurry is separated based on weight, size, density of the materials, or a combination of any of these.

17. The method of claim 16, wherein the fluid further comprises an additive.

18. The method of claim 15, wherein the fluid is water or a water-based fluid.

19. The method of claim 18, wherein the water-based fluid is a fluid mud comprising a mixture of water and bentonite clay.

\* \* \* \* \*